US008848880B2

(12) United States Patent
Wiatrak et al.

(10) Patent No.: US 8,848,880 B2
(45) Date of Patent: Sep. 30, 2014

(54) INTER-SYSTEM COMMUNICATION (75) Inventors: Bruce M. Wiatrak, Bolingbrook, IL (US); Ivan Dean Bogdanovic, Brookline, MA (US)

(73) Assignee: Bridgeport Networks, Inc., Chicago, IL (US)

(*) Notice: Subject to any disclaimer, the term of this patent is extended or adjusted under 35 U.S.C. 154(b) by 1856 days.

(21) Appl. No.: 11/617,931

(22) Filed: Dec. 29, 2006

(65) Prior Publication Data

US 2007/0165653 A1  Jul. 19, 2007

Related U.S. Application Data (60) Provisional application No. 60/754,724, filed on Dec. 29, 2005, provisional application No. 60/806,290, filed on Jun. 30, 2006.

(51) Int. Cl.

| | |
|---|---|
| H04M 11/00 | (2006.01) |
| H04L 12/58 | (2006.01) |
| H04W 4/12 | (2009.01) |
| H04L 29/08 | (2006.01) |
| H04W 4/10 | (2009.01) |
| H04W 76/00 | (2009.01) |
| H04L 29/06 | (2006.01) |
| H04L 12/66 | (2006.01) |
| H04W 8/08 | (2009.01) |
| H04L 12/70 | (2013.01) |
| H04W 88/16 | (2009.01) |
| H04W 92/02 | (2009.01) |

(52) U.S. Cl.
CPC . *H04W 4/10* (2013.01); *H04W 8/08* (2013.01); *H04L 51/04* (2013.01); *H04W 4/12* (2013.01); *H04L 65/105* (2013.01); *H04L 2012/5618* (2013.01); *H04L 65/1096* (2013.01); *H04L 67/24* (2013.01); *H04L 65/1016* (2013.01); *H04L 65/102* (2013.01); *H04L 12/5825* (2013.01); *H04W 88/16* (2013.01); *H04L 12/581* (2013.01); *H04W 92/02* (2013.01); *H04L 51/06* (2013.01); *H04W 76/005* (2013.01); *H04L 65/40* (2013.01); *H04L 65/4061* (2013.01)

USPC ............... 379/88.13; 455/414.3; 370/353

(58) Field of Classification Search
USPC ......... 370/352–356; 455/461; 379/88.01–88.9
See application file for complete search history.

(56) References Cited

U.S. PATENT DOCUMENTS

| 6,360,093 B1 | 3/2002 | Ross et al. | |
|---|---|---|---|
| 8,396,981 B1 * | 3/2013 | Lee et al. | 709/232 |

(Continued)

OTHER PUBLICATIONS

Supplementary European Search Report, European Appication No. 06 84 8391 (5 pages).

(Continued)

*Primary Examiner* — Fan Tsang
*Assistant Examiner* — Solomon Bezuayehu
(74) *Attorney, Agent, or Firm* — Occhiuti & Rohlicek LLP (57) ABSTRACT

In one aspect, a communication system allows telephone users to roam between cellular and broadband domains and obtain equivalent level of service and features in the broadband network as in the cellular network. For example, such users can make use of Push-To Talk service, as well as continuous telephone call service, independent of which domain they are connected through. In another aspect, users can pass messages, including voice messages, or establish two-way voice communication between disparate push-to-talk (PTT) or messaging and/or voice systems. For example, a user on a cellular network using a PTT service is able to communicate with a user on a data network using an IM service. In addition, information is passed between the systems to provide coordinated presence information for users. For example, a user can have presence information in multiple networks enabling users form different networks to communication with that user.

17 Claims, 3 Drawing Sheets

(56) References Cited

U.S. PATENT DOCUMENTS

| | | | |
|---|---|---|---|
| 2002/0167906 A1* | 11/2002 | La Porta et al. | 370/252 |
| 2003/0026289 A1* | 2/2003 | Mukherjee et al. | 370/466 |
| 2003/0069934 A1 | 4/2003 | Garcia-Martin et al. | |
| 2003/0088421 A1* | 5/2003 | Maes et al. | 704/270.1 |
| 2004/0062223 A1* | 4/2004 | Boyd et al. | 370/338 |
| 2004/0165702 A1* | 8/2004 | Finnigan | 379/88.02 |
| 2004/0202117 A1* | 10/2004 | Wilson et al. | 370/310 |
| 2004/0264655 A1* | 12/2004 | Levine | 379/88.18 |
| 2006/0271696 A1* | 11/2006 | Chen et al. | 709/229 |
| 2012/0030298 A1* | 2/2012 | Bells et al. | 709/206 |

OTHER PUBLICATIONS

International Search Report, PCT/US06/49666, mailed Oct. 25, 2007 (1 page).

* cited by examiner

INTER-SYSTEM COMMUNICATION

CROSS-REFERENCE TO RELATED APPLICATIONS

This application claims the benefit of U.S. Provisional Application 60/754,724, filed Dec. 29, 2005, and U.S. Provisional Application 60/806,290, filed Jun. 30, 2006, both of which are incorporated herein by reference.

This application is related to U.S. application Ser. No. 11/183,534, titled "Handoff for Cellular and Internet Protocol Telephony," published as US2006/0116127A1 on Jun. 1, 2006, which is also incorporated herein by reference.

BACKGROUND

This document relates to communicating messages between systems.

In some cellular telephone networks, push-to-talk (PTT) services have been deployed. One approach to such communication makes use of the PTT over Cellular (PoC) standard, which is defined by the Open Mobile Alliance (OMA) and the 3GPP/3GPP2 IMS standards bodies. PTT generally provides a walkie-talkie like service allowing ad-hoc chat voice communications. In general, a PoC system makes use of servers within a telephone system's data network that maintain and exchange presence information of client telephones registered with those servers. The servers also participate in exchanging of messages containing bursts of recorded voice messages.

In data network domains, such as on the public Internet, Instant Messaging (IM) system have been developed and deployed enabling users register with such systems to send text messages to one another. Examples of such systems have been deployed by AOL, Yahoo, Jabber, and others, which enable users to exchange messages over the Internet. Enterprise-based messaging systems have also been developed, including the Microsoft Live Communication Server. In general, IM services enable users to create a kind of private chat room with another individual in order to communicate in real time, for example, over the Internet. Some text systems have been extended to allow recorded voice messages to be exchanged between users of the systems. In general, IM systems make use of one or more centralized servers that maintain presence information related to the users, and that route messages between the users.

Some IM clients, such as from Trillian by Cerulean Studios, can communicate with a number of different IM networks (but not the cellular PTT network), and aggregate presence and contact information in a client which communicates with all network types.

Some IM and PoC networks have separately migrated to use of to the Session Initiation Protocol (SIP) as a base protocol. However existing PoC and IM networks utilize different procedures and presence models, operate on decoupled data networks, and have not been integrated to form an interoperable system.

SUMMARY

In one aspect, in general, telephone users that roam between cellular and broadband domains can expect equivalent level of service and features in the broadband network as in the cellular network. For example, such users can make use of Push-To Talk service, as well as continuous telephone call service, independent of which domain they are connected through.

In another aspect, in general, an approach to message and/or voice communication enables users to pass messages, including voice messages, or establish two-way voice communication between disparate PTT or messaging and/or voice systems. For example, a user on a cellular network using a PTT service is able to communicate with a user on a data network using an IM service. In addition, information is passed between the systems to provide coordinated presence information for users. For example, a user can have presence information in multiple networks enabling users form different networks to communication with that user.

In another aspect, in general, a communication system aggregates presence, contact and session management (pre-established connections, compression, authentication, authorization, security) across disparate networks. For example, this can lead to a single identity and transparent PTT over cellular and broadband Instant Messaging presence across multiple communication domains.

In another aspect, in general, Instant Messaging (IM) and presence networks available from products such as Microsoft Live Communication Server and services such as Yahoo, AOL and Skype, as well as from a cellular PTT system, are interconnected to provide interoperability between the systems. For example, the interoperability includes aspects such as authentication, compression, and pre-establishing connections.

In another aspect, in general, a method for communication includes coupling a wireless telephone network and a data network through a gateway. User presence information is then coordinated between a first communication system hosted on the wireless telephone network and a second communication system hosted on the data network through the gateway.

In another aspect, in general, a communication system includes a gateway coupling a wireless telephone network and a data network. The gateway is configured to coordinate user presence information between a first voice message system hosted on the wireless telephone network and a second voice message system hosted on the data network through the gateway.

In another aspect, in general, a communication gateway includes a first interface to a wireless telephone network, a second interface to data network, and a proxy for coordinating presence information of a first voice messaging system accessed through the first interface and presence information of a second voice messaging system accessed through the second interface and for passing voice messages between the voice messaging systems.

Aspects can include one or more of the following features.

The first communication system includes a first voice message system and the second communication system includes a second voice message system.

Voice messages are passed between the first voice message system and the second voice message system through the gateway. The first voice message system can include a telephone push-to-talk system, for example, a push-to-talk over cellular (PoC) system. The second voice message system can include an instant-messaging system, for example, a public instant-messaging system.

User contact data is passed between the first communication system and the second communication system through the gateway.

The second communication system includes a two-way voice communication system. For example, the two-way voice communication system comprises a Voice-over-IP (VoIP) communication system. As another example, the two-way voice communication system includes a private telephone system.

Coordinating the user presence information includes maintaining a presence in the first communication system for a first user present in the second communication system.

Maintaining the presence in the first communication system for the first user present in the second communication system includes maintaining a proxy for the first user in the gateway, and registering the proxy in the first communication system on behalf of the first user.

The first communication system includes a push-to-talk over cellular system and registering the proxy in the first voice messaging system on behalf of the first user includes registering an address associated with the proxy with a push-to-talk over cellular server.

Coordinating the user presence information includes accessing from the gateway a data storage for presence information hosted in at least one of the first and the second voice messaging systems.

Aspects can have one or more of the following advantages.

Disparate presence models in different systems are supported so that a user's presence in one system can be known in the other systems. This enables a user in one system to determine the presence of another user independent of the system that other user is in and optionally ignorant of the other system. For example, the PoC network uses XCAP and PIDF to update presence and contact information, while the Microsoft LCS uses SIP/SIMPLE and a modified PIDF (Presence Information Data Format) for presence information between the PoC network and the LCS system.

Although client applications may be available that aggregate presence and contact information in a client which communicates with a number of different IM network types, there is currently a lack of support for PoC in such systems. Therefore, it is advantageous to aggregate both the PoC PTT system as well as IM systems.

A purely client-based approach aggregation or interoperability of different systems may be inefficient in a mobile telephone environment. For example, although a client application may be hosted in a mobile telephone and linked to IM systems on the Internet, such an approach may incur excessive communication cost, computation load, or power consumption, as compared to an approach in which a proxy application is used instead of or in addition to a mobile-based application.

Other features and advantages of the invention are apparent from the following description, and from the claims.

DESCRIPTION

Figure 1:
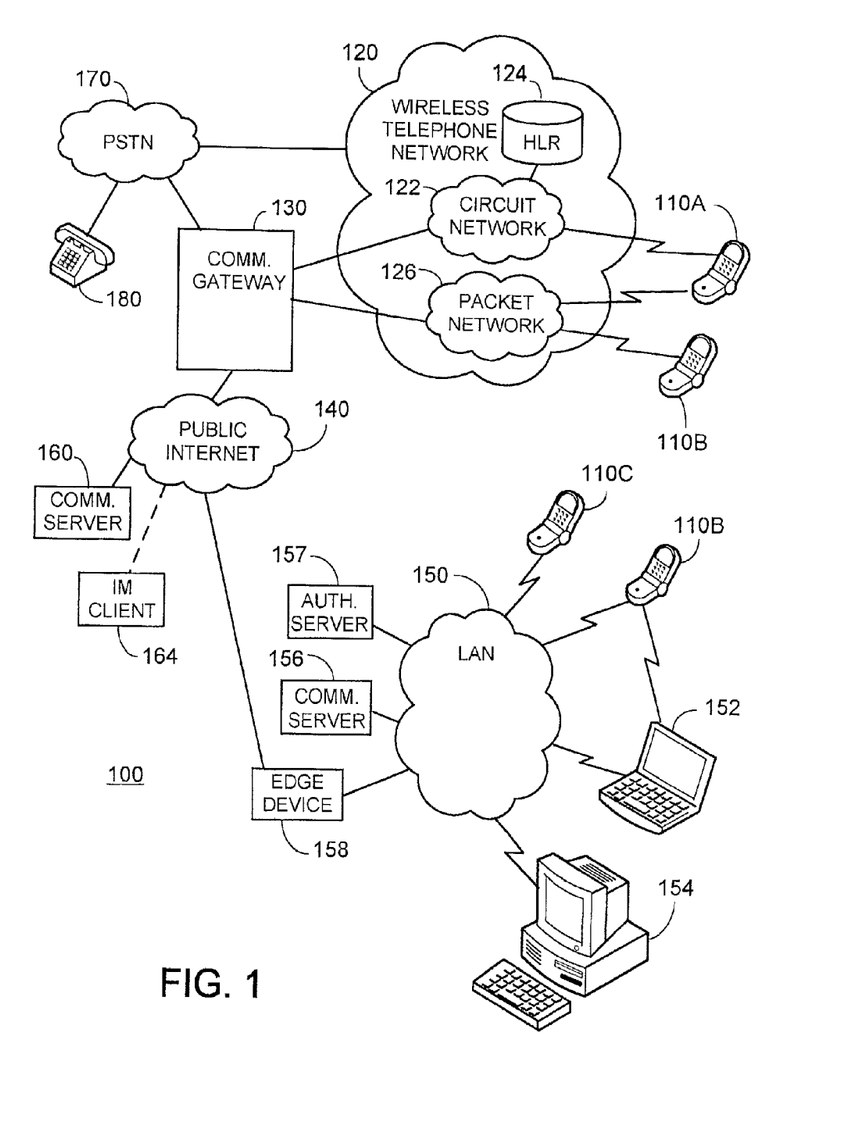
FIG. 1 is a diagram of a communication system.

Referring to FIG. 1, a communication system 100 supports communication between user devices such as mobile telephones 110A-C, conventional wireline telephones 180, computer-based instant messaging (IM) clients 164, and other client applications hosted on computers 152 and 154. User devices, such as mobile telephones 110A-B, may be coupled to a wireless telephone network 120, such as a GSM or CMDA based network. Other user devices, such as mobile telephones 110B-C and computers 152 and 154 may be coupled to a local area network (LAN) 150. Other devices, such as an IM client 164 may be coupled to the public Internet 140. Conventional telephones 180 are generally coupled to the public switched telephone network (PSTN) 170. One feature of the communication system 100 is that a communication gateway 130 provides services that allow user device on different of the domains (e.g., wireless telephone network 120, PSTN 170, LAN 150, Internet 140) to communicate in a manner than provides a degree of seamless mobility between the domains.

U.S. Publication US2006/0116127A1, "Handoff for Cellular and Internet Protocol Telephony," which is incorporated by reference, describes certain functionality of an example of a communication gateway 130 that allows mobility of a mobile telephone 110A-C between a cellular domain and a data network domain. In particular, a mobile telephone that has a radio interface suitable for communicating with the wireless telephone network 120 as well as a radio interface for communicating with a wireless LAN (i.e., a "dual mode" telephone) can maintain a presence in the wireless telephone network and/or in the data network domain LAN. When the mobile telephone is in the data network domain, for example, with a data connection established on LAN 150, the gateway 130 provides presence information to the wireless telephone network 120 so that telephone calls placed to that mobile telephone through the wireless telephone network are passed to the mobile telephone via the gateway. Over the data network between the gateway and the telephone, the telephone call is carried in data packets according to a Voice-over-IP (VoIP) communication protocol. To maintain presence for the telephone when it is in the data network domain, information in the Home Location Register (HLR) 124 of the wireless network 120 is updated to reflect the gateway serving as the node in the wireless network through which circuits to the telephone in the data network domain are to be established. Also, telephone calls placed from such a mobile telephone are passed through the gateway 130 to the wireless telephone network 120 and routed through that network to their destination or passed directly from the gateway to the PSTN 170. In addition to supporting mobility of a mobile telephone between the wireless telephone network and a wireless LAN, the gateway also supports delivery to and placing of telephone circuit calls from a user's computer.

The wireless telephone network includes a circuit network 122 over which mobile telephones establish voice communication circuits. The wireless telephone network also includes a packet network 126, such as a network based on the GPRS or EVDO approaches. One use of the packet network is to support Short Message Service (SMS) (and various extensions, including Multimedia SMS) communications between telephones, such as between telephones 110A and 110B. The gateway 130 is coupled to the packet network 126 and provides functionality to pass SMS messages to mobile telephones that are present in the data network domain. On the data network, the messages use messaging capabilities of the Session Initiation Protocol (SIP). Note that the packet network 126 may use Internet Protocol (IP) for routing packets, but the network is not inter-networked with the public Internet 140. That is, packets are not simply routed between the packet network 126 and the Internet 140 without processing above the network layer.

An SMS message can be originated at a mobile telephone in the wireless telephone network. Each telephone is provisioned to be associated with a particular Short Message Service Center (SMSC). The SMSC performs a store-and-forward function for SMS messages. When a mobile telephone originates an SMS message, the message first passes to the SMSC provisioned for that telephone. The SMSC uses the destination address of the message (i.e., another telephone number) and queries the Home Location Register (HLR) for that destination to determine the serving MSC address for the message. The SMSC then delivers the SMS message to the serving MSC over the data network 126. When a mobile telephone 110C is present in the data domain, the communication gateway 130 has interacted with the HLR responsible for that telephone and identified the gateway 130 as providing the serving MSC function for that telephone. Therefore, the SMS message addressed to a telephone 110C is passed from the SMSC of the originating telephone to the communication gateway 130, which then forwards the message to the telephone over the public data network using SIP.

Similarly, an SMS message originated at mobile telephone 110C that is present in the data domain is passed to the communication gateway 130, and from the gateway to the SMSC provisioned for the originating telephone, from where it is forwarded in the same manner as if telephone 110C were present directly in the wireless telephone network.

One version of the system, a user may be present in the data domain and able to receive and originate telephone calls but not necessarily have a device that can accept or originate SIP based SMS messages. For example, if the user is present on LAN 150 using a VoIP telephone, the user may be registered with the communication gateway but not able to receive the SIP based messages. Therefore, the messages for that telephone are queued at the SMSC(s) until the telephone returns to the wireless telephone network. In other versions of the system, the communication gateway implements a bridging function to convert SMS messages for communication over other messaging systems, for example, via an Instant Messaging (IM) system to the user.

In some examples, the wireless telephone network 120 also supports a Push-to-talk (PTT) over Cellular (PoC) capability which provides a "walkie-talkie" like capability to users of telephone, such as telephones 110A and 110B that are present in the wireless telephone network. Generally, PoC is implemented by encoding a voice message at a sending telephone, and then passing the encoded message over the packet network 126 to a receiving telephone (or multiple receiving telephones) for example using VoIP. An approach to PoC has been proposed as a standard by the Open Mobile Alliance. The approach makes us of the Session Initiation Protocol (SIP) for passing encoded voice information over the packet network 126 of the wireless telephone network. The approach uses SIP INVITE messages and passes packet-based data using the Real Time Protocol (RTP) over the packet network 126. Note that the SIP interactions between telephones in the wireless telephone network are not sent outside the packet network 126 to the public Internet—they remain private to the wireless telephone network.

In order to support mobility using the PoC service between the wireless telephone network 120 and a data domain such as LAN 150, the communication gateway 130 provides a proxy function to enable a telephone 110C to participate in PoC communication. In order to extend PoC into the public data domain that includes the Internet, in general, the communication gateway 130 interacts with elements of the wireless telephone network for the purpose of maintaining presence information in the wireless telephone network for a telephone that is actually present in the data domain and to pass PoC communication data between the domains. Note that the gateway does not have to provide bridging or routing of network or transport layer communication between the packet network 126 and the public Internet 140 operating largely at the application layer.

Figure 2:
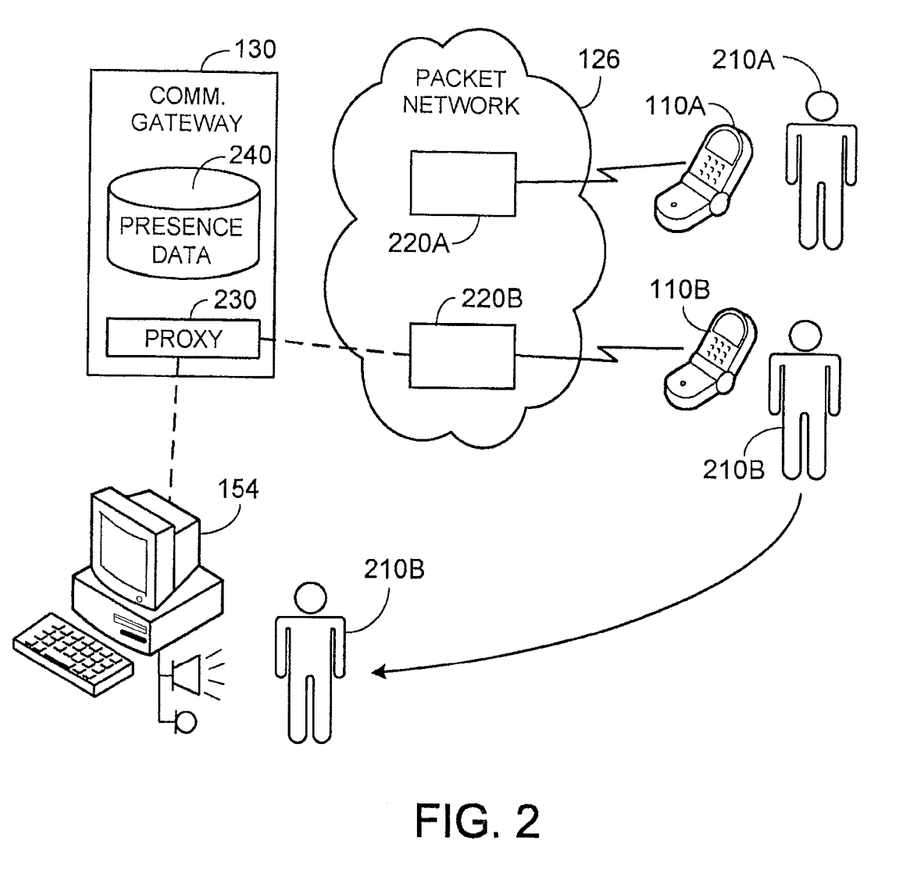
FIG. 2 is a diagram of a portion of a communication system.

Referring to FIG. 2, an example of a PoC approach associates different servers 220A-B with different clients (i.e., with different mobile telephones 110A-B) providing communication services and maintaining presence information for corresponding users 210A-B. In general, when a mobile telephone 110A is powered on and connects to the wireless telephone network, it registers with its own server 220A and provides its network address on the packet network 126. Note that registration and mobility management does is done completely or largely independently of the HLR and identification of the serving MSC for each telephone. The identity or address of a telephone's server is provisioned for that telephone or is assigned dynamically within the packet network 126.

A user, such user 210A at telephone 110A, may subscribe to another user's presence information, such as presence information for user 210B at telephone 210B. One use of this presence information may be to maintain an active "buddy list" on user 210A's telephone. In the example shown in FIG. 2, telephone 110A is associated with server 220A and telephone 110B is associated with server 220B. Server 220A informs server 220B of its desire to be informed when user 210B registers. When user 210B does register at the time telephone 110B powers up, server 220B sends a NOTIFY message to server 220A identifying itself as the server that can route the PoC voice bursts to user 210B. A number of different users may have subscribed to user 210B's presence information, and their servers are all informed by server 220B when the user registers. When server 220A receives the presence information for user 210B, it forwards it to telephone 110A.

When a telephone registers with its PoC server, it establishes a RTP communication session that is maintained while the telephone remains on the wireless network. Voice burst data flow through these sessions when a PoC voice message is sent. For example, for a PoC interaction from telephone 110A and 110B on different servers (server 220A and server 220B, respectively), telephone 110A first sends an INVITE to server 220A. Server 220A then sends the INVITE to server 220B. Server 220B then sends the INVITE to telephone 110B. A session is set up that hops between the servers 220A-B. Because telephones have pre-established their RTP sessions with their corresponding servers, the PoC voice burst is not delayed by those RTP setup times. Various alternative ways of passing a message from telephone 110A to 110B can be based on the presence information maintained at servers 220A and 220B.

When a user 210B moves over to the data domain, the telephone 110B looses its connectivity to server 220B in the same way that it would loose connectivity if it were powered off. When the user 210B establishes presence in the data domain, for example through a computer 154 that hosts suitably compatible client software (or alternatively through the same mobile telephone 110B that has a dual mode radio capability enabling it to access the LAN or a telephone linked through a computer 152 via a Bluetooth or other local link), the communication gateway 130 becomes aware of the user's presence and their network address on the public Internet. Data traffic from the user to destinations not in the wireless telephone network 120 does not have to travel through the gateway or through the wireless network. This data is routed using conventional IP-based routing, for example, directly to a destination over the public Internet.

When the communication gateway 130 receives registration information from the user 210B in the data domain, it performs a PoC registration to that user's server 220B. Rather than providing the network address of the user on the public Internet, the gateway 130 provides a network address of a proxy 230 that is hosted in the gateway. The network address provided by proxy 230 to server 220B is a routable address within the packet network 126. Note that the server 220B is able to accept a different network address for the user than had been used by the telephone 110B when it was present on the wireless network. The proxy 230 establishes a RTP session with the server 220B over the packet network and also maintains communication with the user over the public Internet. For example, the proxy establishes a RTP session between itself and the user's computer 154. The proxy functions as a back-to-back user agent so that SIP messages (e.g., INVITE message) received from server 220B for user 210B are passed to the user's computer 154, and SIP messages received from the computer 154 for the server 220B are passed to the server. The proxy 230 performs any necessary translations of the messages, for example, changing network addresses in the messages.

When server 220B receives user 210B's registration information, it informs server 220A, which in turn informs telephone 110A, which has subscribed to that user's presence information. PoC communication between user 210A and 210B follows the example above, with the exception that former communication between server 220B and telephone 110B now passes between server 220B and computer 154 via the proxy 130. Similarly, PoC communication initiated at computer 154 for user 210B passes between computer and server 220B via the proxy.

Referring back to FIG. 1, another feature of the communication system 100 is that PoC communication from the wireless telephone network 120 can be exchanged with external Instant Messaging (IM) systems, such as IM systems (e.g., Yahoo, MSN, Google, Skype, and Microsoft Live Communication (LCS) systems) accessible over the public Internet 140, as well as some peer-to-peer networks that support voice message exchange. Some of these external IM systems support voice data exchange using VoIP, which from a user's point of view, provide functionality that overlaps with the functionality provided to a PoC user.

The communication gateway 130 connects the disparate external IM systems with the PoC system provided within the wireless telephone network. For example, the gateway provides a way for a telephone user to send a push-to-talk message from a telephone 110A to an IM client 164 on the public Internet.

Figure 3:
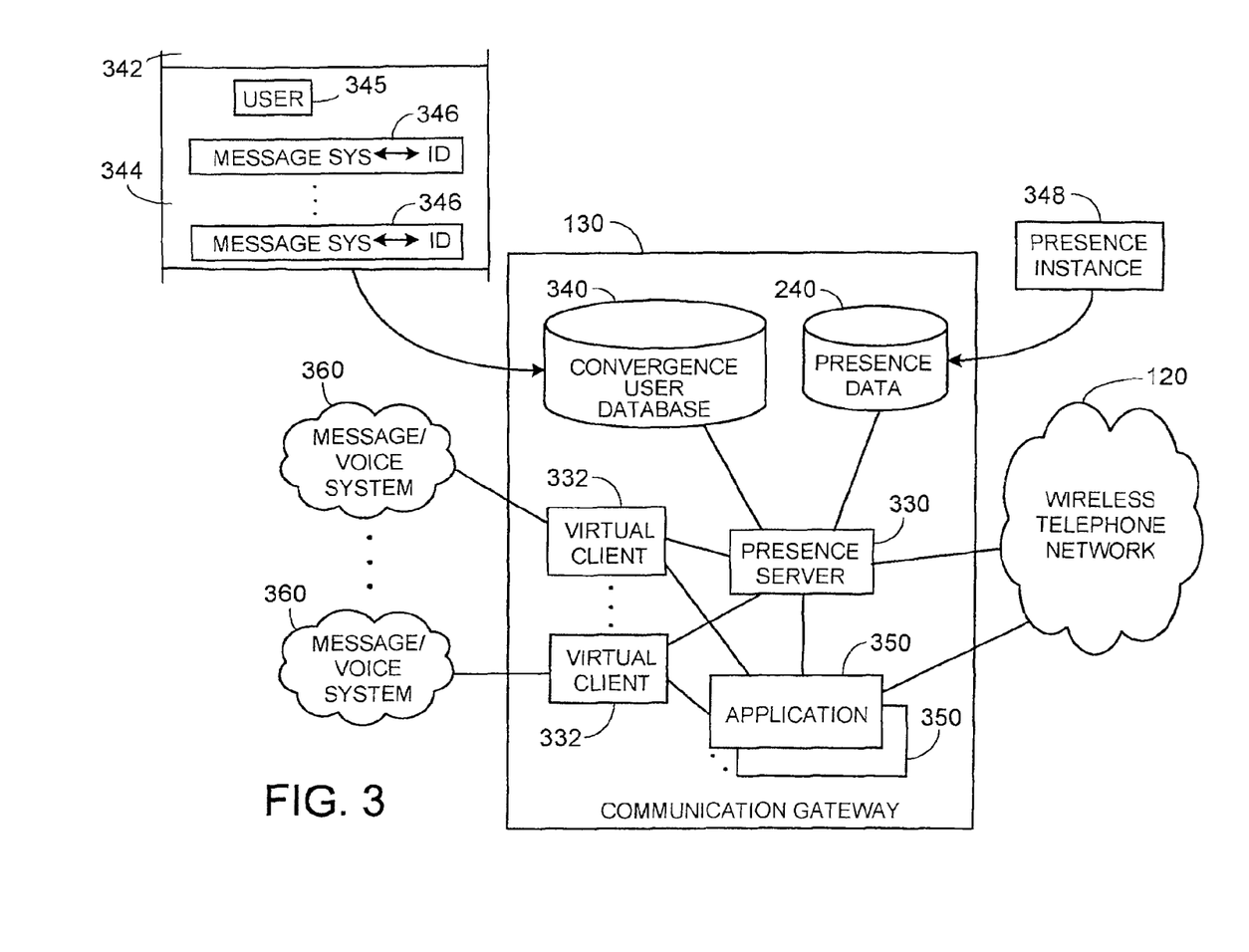
FIG. 3 is a diagram of a portion of a communication system that includes a communication gateway.

Referring to FIG. 3, in addition to providing a way for the messages themselves to pass between the different domains, the communication gateway 130 exchanges presence information between the domains so that a user on the telephone network can be made aware of another user's presence when that other user is present in an IM network, and that an IM user can be made aware of a user's presence when they are accessible over a PoC system.

The communication gateway 130 includes a convergence user database 340, or alternatively accesses a remote such database. This database includes a table 342 that includes records 344 each associated with a different user 345. Each user 345 is associated with a number of associations of a messaging/voice system 360 and identification of that user on that messaging system. The messaging/voice systems 360 can include various types of communication systems including without limitation, voice, SMS, IM, file sharing, and MMS system. As an example, one user may have SIP identifications (URIs, universal resource indicators) on multiple voice and/or messaging systems or other SIP-based systems and may also have a "screen name" on a commercial instant messaging system in addition to having an identity on the wireless telephone system 120.

When a user registers with the communication gateway, or the gateway otherwise determines that the user is present on the wireless network 120 or on one of the messaging/voice systems 360, a presence server 330 at the gateway queries the convergence user database 340 to determine a set of identities of the user on the various systems. The gateway then stores the mapping between the user identities in a presence database 240, which includes a presence instance 348 associated with that user. The presence database 240 can also serve as a cache that is accessed first when a user registers with the convergence database 340 being used if the user's identification information is not already in the database 240.

The presence server 330 uses a set of virtual clients 332 for the registered user, such that from the point of view of each of the message/voice systems 360 that are identified in that user's set of identities, the user is present in the system. For example, in this way other users of the message/voice systems 360 may become aware or informed of the user's presence using internal presence mechanisms implemented in message/voice system.

When the user that registered with the communication gateway wants to establish communication with another user, who may be on another of the message/voice systems 360, the communication passes through an appropriate application 350, which makes use of information from the presence server 330 to determine the virtual client 332 through which to establish communication with the other user and to determine how the communication may need to be reformatted.

Similarly, when a user on one of the message/voice systems 360 desires to communicate with the registered user, that communication passes through the virtual client 332 for the registered user, through the appropriate application 350, and to the user.

Presence information that is maintained in an IM system may include details that go beyond a binary present/not present indication. For example, the presence information may indicate how long the user has been online, how long the user has been inactive (e.g., without keyboard input), whether the user doesn't want to be disturbed, or other indicators of a level or a category of presence or activity. Each IM system, and the PoC system, may have a different presence model that characterizes a user's type or level of presence in the system. The presence models of the various systems do not necessarily match one another or allow a simple mapping between the models.

Presence information that is maintained in the IM systems can also relate to authentication information. Therefore, in order to inter-operate between systems, cross-system authentication approaches are needed or desirable. Furthermore, in the PoC system, user authentication is not part of the presence model or system as authentication is provided implicitly by the telephone system itself.

In one example of this approach of interoperating IM systems with the PoC system, an enterprise level communication server 156 is present on the LAN 150. A user 210B that has a telephone 110B on the wireless telephone network also has an identity on the communication server 156. As an example, the communication sever 156 is a Microsoft Live Communication Server (LCS).

The communication server 156 maintains presence information, for example, for the user 210B. The communication server 156 provides a software Application Program Interface (API) that allows the presence information on the server to be sent to the communication gateway. For example, when user 210B logs in on computer 154 and establishes communication with the communication server 156, the user's presence is communicated to the communication gateway 130. Similarly, when the user is idle for some period of time, such detailed presence information is also passed to the communication gateway. The communication gateway then interacts with the user's PoC server in the wireless network so that PoC messages that are meant for user 210B are passed through the gateway, translated into an appropriate format, and forwarded to the communication server 156 and then to the user's computer 154.

Similarly, the communication gateway 130 subscribes to PoC presence information with the user's PoC server for other users on the wireless telephone network, suitably translates the presence data and passes the presence data to the communication server 156 on the LAN. When a user on the LAN wants to send a voice burst to a user that is registered in the PoC system, the message is sent by the communication server 156 to a user proxy function in the communication gateway where the message is translated and forwarded to the appropriate PoC server in the wireless network.

In addition to passing presence information between the domains, the communication gateway also passes user data, such as contact data, between the domains. For example, a mobile telephone 110A sends its contact data to a communication server 220A when it powers up. The communication gateway receives this contact data and exchanges it with the communication server 156 so that the data can be synchronized in the two domains. For example, a user's telephone and that user's IM client can thereby have a consistent buddy list. A goal is to maintain a single "identity" for a user across domains and to provide a consistent contact data independent of the domain over which the user is accessing the system.

Various versions of the approach support different subsets of features described above. Only a subset of systems, such as server based Instant Messaging or Peer-to-Peer VoIP PTT systems, need be supported. Furthermore, different techniques for passing presence information between systems can be used for different systems. For example, some systems may provide an API for accessing presence information on a server enabling the gateway to access and modify presence information directly. Other systems may require that the gateway simulate presence activity of a user in order to indirectly modify or access presence information in a system. For example, the gateway may emulate an IM client and simulate activity to signal the presence of a user to such a system. Some systems may support a distributed presence synchronization approach whereby the gateway may directly participate with a server of such a system. For example, the Microsoft LCS may support a federated presence maintenance approach allowing the gateway to maintain synchronization of presence information.

In some approaches to enabling delivery of PoC voice bursts from the telephone system to Internet based IM or P2P clients the recipient must have a known identity in the telephone system by having a mobile telephone account in that telephone system. As an alternative, a telephone system may permit registration of PoC users without requiring that they in fact have mobile telephone accounts. For example, one or more PoC servers (or equivalent functionality co-hosted with the communication gateway) can support a particular external IM system.

It is to be understood that the foregoing description is intended to illustrate and not to limit the scope of the invention, which is defined by the scope of the appended claims. Other embodiments are within the scope of the following claims.

What is claimed is:

1. A method for communication comprising:
coupling a wireless telephone network and a data network through a gateway; and
coordinating user presence information between a first communication system including a first presence system maintaining presence information using a first presence model and hosted on the wireless telephone network and a second communication system including a second presence system maintaining presence information using a second presence model and hosted on the data network through the gateway, wherein the coordinating includes one or more of the following:
translating, by the gateway, first user presence information stored in a storage device in the wireless telephone network in association with a first user from the first presence model of the first presence system to the second presence model of the second presence system, the first user presence information being indicative of a presence in the first communication system of the first user on the wireless telephone network, and forwarding, by the gateway, the translated first user presence information to the data network to effect a storing of the translated first user presence information in a storage device in the data network, wherein subsequent to the storing, the first user on the wireless telephone network appears to users of the first communication system to be present in the first communication system hosted on the wireless telephone network and appears to users of the second communication system to be present in the second communication system hosted on the data network; and
translating, by the gateway, second user presence information stored in the storage device in the data network in association with a second user from the second presence model to the first presence model, the second user presence information being indicative of a presence in the second communication system of the second user on the data network, and forwarding, by the gateway, the translated second user presence information to the storage device in the wireless telephone network to effect a storing of the translated second user presence information in the storage device in the wireless telephone network, wherein subsequent to the storing, the second user on the data network appears to users of the first communication system to be present in the first communication system hosted on the wireless telephone network and appears to users of the second communication system to be present in the second communication system hosted on the data network.

2. The method of claim 1 wherein the first communication system comprises a first voice message system and the second communication system comprises a second voice message system.

3. The method of claim 2 further comprising: passing voice messages between the first voice message system and the second voice message system through the gateway.

4. The method of claim 2 wherein the first voice message system comprises a telephone push-to-talk system.

5. The method of claim 2 wherein the telephone push-to-talk system comprises a push-to-talk over cellular (PoC) system.

6. The method of claim 2 wherein the second voice message system comprises an instant-messaging system.

7. The method of claim 2 wherein the instant-messaging system comprises a public instant-messaging system.

8. The method of claim 1 further comprising: passing user contact data between the first communication system and the second communication system through the gateway.

9. The method of claim 1 wherein the second communication system comprises two-way voice communication system.

10. The method of claim 8 wherein the two-way voice communication system comprises a Voice-over-IP communication system.

11. The method of claim 8 wherein the two-way voice communication system comprises a private telephone system.

12. The method of claim 1 further wherein coordinating the user presence information includes maintaining a presence in the first communication system for a first user present in the second communication system.

13. The method of claim 12 wherein maintaining the presence in the first communication system for the first user present in the second communication system comprises maintaining a proxy for the first user in the gateway, and registering the proxy in the first communication system on behalf of the first user.

14. The method of claim 13 wherein the first communication system comprises a push-to-talk over cellular system and registering the proxy in the first voice messaging system on behalf of the first user includes registering an address associated with the proxy with a push-to-talk over cellular server.

15. The method of claim 1 further wherein coordinating the user presence information comprises accessing from the gateway a data storage for presence information hosted in at least one of the first and the second voice messaging systems.

16. A communication system comprising:
a gateway coupling a wireless telephone network and a data network;
wherein the gateway is configured to:
coordinate user presence information between a first voice message system including a first presence system maintaining presence information using a first presence model and hosted on the wireless telephone network and a second voice message system including a second presence system maintaining presence information using a second presence model and hosted on the data network through the gateway, wherein the coordination of the user presence information includes one or more of the following:
translation of first user presence information stored in a storage device in the wireless telephone network in association with a first user from the first presence model of the first presence system to the second presence model of the second presence system, the first user presence information being indicative of a presence in the first voice message system of the first user on the wireless telephone network, and forwarding of the translated first user presence information to the data network to effect a storing of the translated first user presence information in a storage device in the data network, wherein subsequent to the storing, the first user on the wireless telephone network appears to users of the first voice message system to be present in the first voice message system hosted on the wireless telephone network and appears to users of the second voice message system to be present in the second voice message system hosted on the data network and
translation of second user presence information stored in the storage device in the data network in association with a second user from the second presence model to the first presence model, the second user presence information being indicative of a presence in the second voice message system of the second user on the data network, and forwarding of the translated second user presence information to the storage device in the wireless telephone network to effect a storing of the translated second user presence information in the storage device in the wireless telephone network, wherein subsequent to the storing, the second user on the data network appears to users of the first voice message system to be present in the first communication system hosted on the wireless telephone network and appears to users of the second voice message system to be present in the second communication system hosted on the data network.

17. A communication gateway comprising:
a first interface to a wireless telephone network;
a second interface to a data network;
a proxy for coordinating presence information of a first voice messaging system including a first presence system maintaining presence information using a first presence model and accessed through the first interface and presence information of a second voice messaging system including a second presence system maintaining presence information using a second presence model and accessed through the second interface and for passing voice messages between the voice messaging systems, wherein the proxy is operable to:
translate first user presence information stored in a storage device in the wireless telephone network in association with a first user from the first presence model of the first presence system to the second presence model of the second presence system, the first user presence information being indicative of a presence in the first voice messaging system of a first user on the wireless telephone network, and forward the translated first user presence information to a storage device in the data network to effect a storing of the translated first user presence information in the storage device in the data network, wherein subsequent to the storing, the first user on the wireless telephone network appears to users of the first voice messaging system to be present in the first voice messaging system hosted on the wireless telephone network and appears to users of the second voice messaging system to be present in the second voice messaging system hosted on the data and
translate second user presence information stored in the storage device in the data network in association with a second user from the second presence model to the first presence model, the second user presence information being indicative of a presence in the second voice messaging system of a second user on the data network, and forward the translated second user presence information to the storage device in the wireless telephone network to effect a storing of the translated second user presence information in the storage device in the wireless telephone network, wherein subsequent to the storing, the second user on the data network appears to users of the first voice messaging system to be present in the first communication system hosted on the wireless telephone network and appears to users of the second voice messaging system to be present in the second communication system hosted on the data network.

* * * * *